Jan. 19, 1943.  C. C. MISFELDT  2,308,998
METHOD AND MEANS FOR CUTTING AND FORMING SHEET METAL
Filed May 28, 1940  3 Sheets-Sheet 1
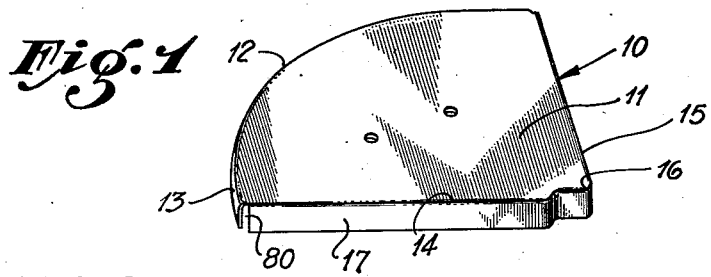
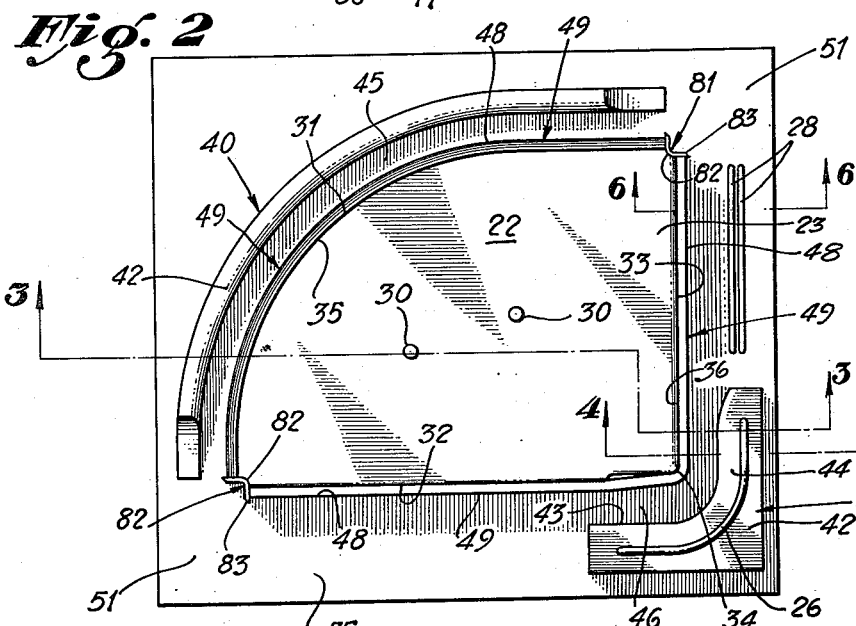
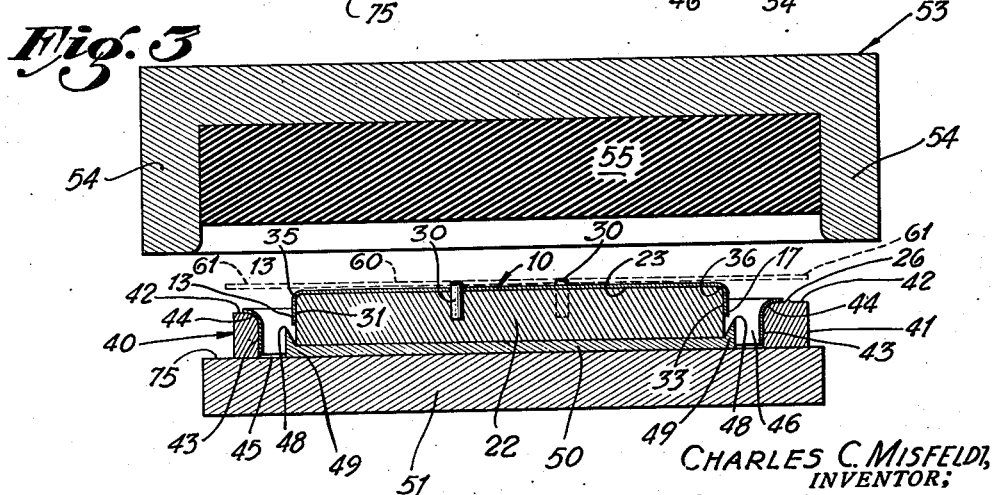
CHARLES C. MISFELDT,
INVENTOR;
BY
ATTORNEY.

Jan. 19, 1943.   C. C. MISFELDT   2,308,998
METHOD AND MEANS FOR CUTTING AND FORMING SHEET METAL
Filed May 28, 1940   3 Sheets-Sheet 2
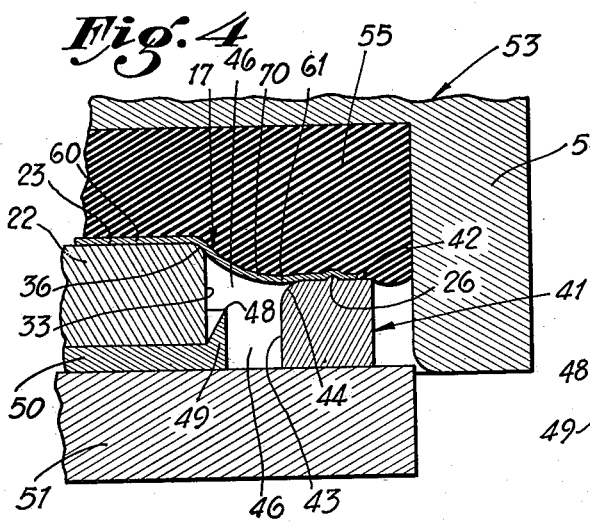
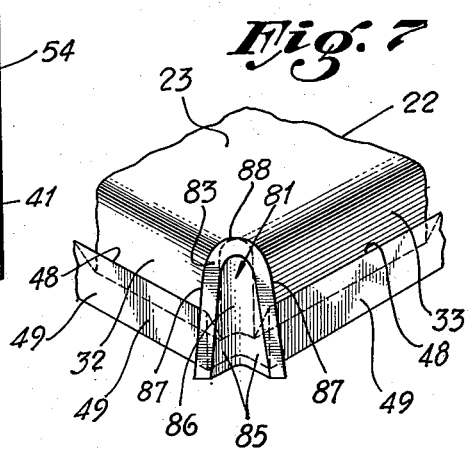
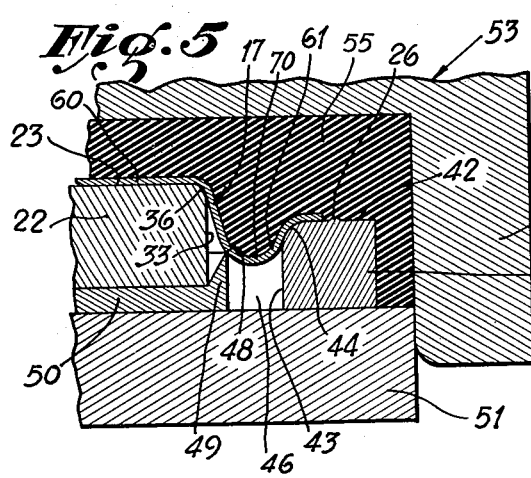
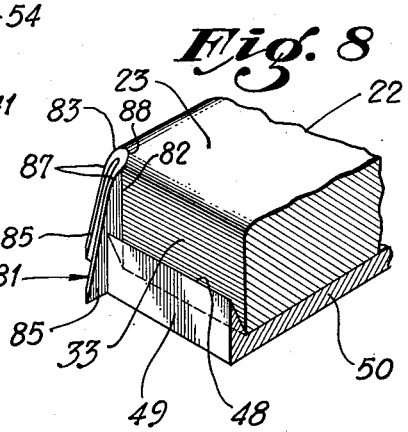
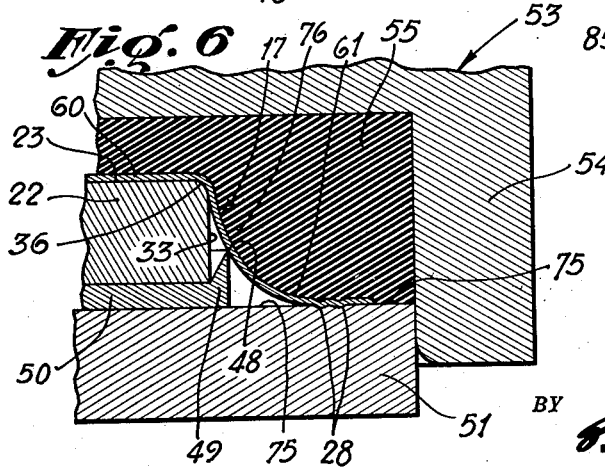
CHARLES C. MISFELDT,
INVENTOR;
BY 
ATTORNEY.

Jan. 19, 1943.  C. C. MISFELDT  2,308,998
METHOD AND MEANS FOR CUTTING AND FORMING SHEET METAL
Filed May 28, 1940  3 Sheets-Sheet 3
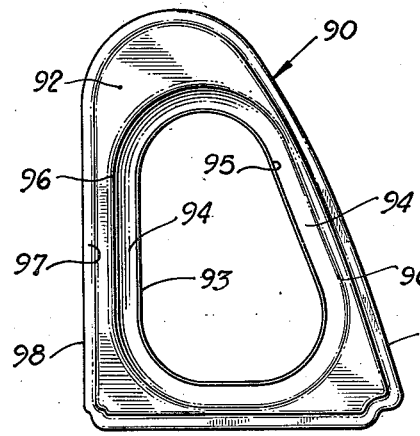
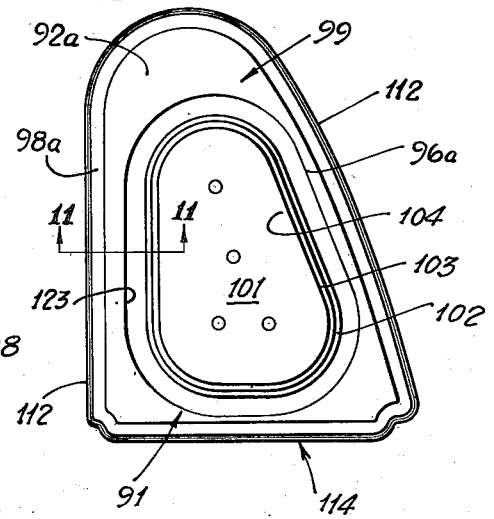
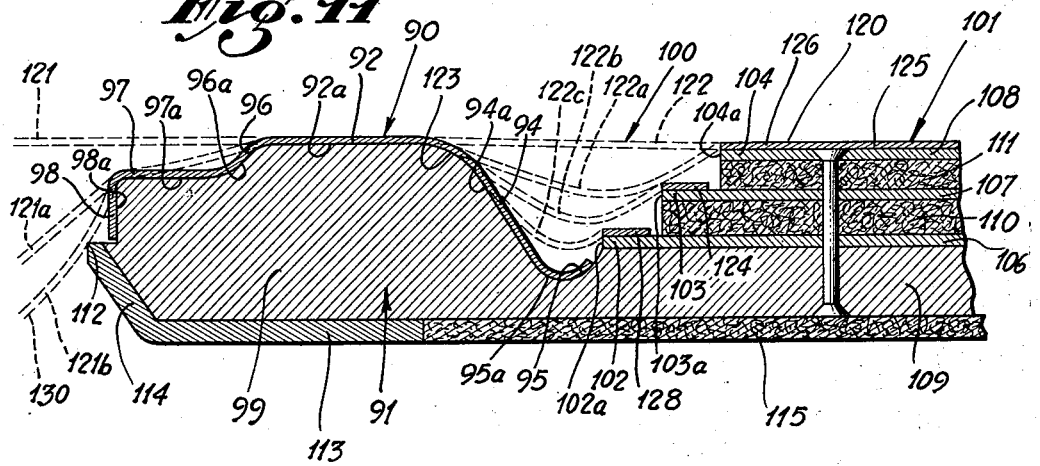
CHARLES C. MISFELDT,
INVENTOR;
BY
ATTORNEY.

Patented Jan. 19, 1943

2,308,998

UNITED STATES PATENT OFFICE 2,308,998

METHOD AND MEANS FOR CUTTING AND FORMING SHEET METAL

Charles C. Misfeldt, Glendale, Calif., assignor to Douglas Aircraft Company, Inc., Santa Monica, Calif., a corporation of Delaware Application May 28, 1940, Serial No. 337,623

8 Claims. (Cl. 113—42)

My invention relates to a method and means for forming dished, flanged, and contoured articles from sheets of material having such characteristics that it may be bent, drawn, and formed to conform to the shape of a forming member, the invention being intended principally for the forming of parts from sheet metal but not being limited thereto. The present invention is an improvement over the process known in the aircraft manufacturing industry as the Guerin process and disclosed in the patents to Henry E. Guerin Nos. 2,055,077, and 2,133,445, wherein sheet metal is cut and formed by use of simple forming and cutting blocks against which the sheet metal is forced by a body of elastic conformable material, such as a rubber compound, for example.

An object of the present invention is to provide a process for making parts having greater depth of draw in conjunction with relatively sharp contour, than is possible in prior art processes with a given character and thickness of sheet material.

In a process, where a portion of the sheet metal is forced down into a space adjacent to an edge or a shoulder of a forming block, the only external control on the movement of this portion of the sheet prior to engagement with a wall of the forming block is that which is exerted by the rubber material in contact with the upper surface of the sheet portion. The rubber, due to its plastic and/or fluid-like characteristics, may move in all directions. Therefore, it does not exercise an independent control of the movement of the sheet toward the faces of the forming block, but merely cooperates with other factors involved in the process, one of which is flow of the metal in directions and to degrees which may depend upon a number of considerations, including contour of the shoulder of the forming block, relief of the shoulder, slope of the side wall leading down from the shoulder and tensile strength of the sheet in different areas and along different lines as compared to the resultant forces produced in the metal by the application of the body of rubber compound to one face of a portion of a sheet while the other face of this portion is unsupported.

An important object of the present invention is to provide means in a process of the general character described for accomplishing a better control of the flow of the sheet metal, to cause metal to flow from salvage portions of the sheet, to avoid thinning of the metal due to the forming action, to concentrate the crystallizing effects in the metal structure to areas constituting salvage which is removed from the finished part, and to accomplish a deep drawing of contoured flanges and means without wrinkling of the sheet.

It is an object of the invention to provide a method and means whereby plate members having flanges along straight and curved or contoured edges thereof may be formed with such flanges in a single operation without wrinkling of the sheet from which the plate members are formed.

It is an object of the invention to provide a method and apparatus wherein flanges are formed along contoured edges by drawing the metal causing it to flow to such extent that wrinkling is avoided, thereby eliminating the need for cut-outs in the flanges to compensate for excess metal.

It is a further object of the invention to provide a method and apparatus for drawing, forming, and cutting parts from sheet metal wherein the need for hand finishing is minimized; wherein the manufacturing time and number of operations are materially reduced; wherein there is greater economy in the use of sheet metal for the reason that there is less scrap; wherein the metal entering into certain flanges are first drawn and then cut or trimmed as a substantially continuous operation; wherein less space is required and wherein the cutting blades are easily applied to the forming block; and wherein a desired constraining effect or restraint is put on certain portions of the sheet so that the desired drawing effect may be produced on selected portions in accordance with the characteristics of the forming block on which the part is made and the extent to which the metal must be caused to flow to accomplish a desired effect.

It is a further object of the invention to provide a method and apparatus wherein the sheet which is to be drawn, formed, and cut is engaged on one side thereof by the elastic conformable material and is engaged on its other side by spaced means disposed so as to form a recess therebetween in which a cutting or parting element is placed, at least one of the engaging means restraining the portion of the sheet between the engaging means from free movement so that the pressure and movement of the material will flow and bend the portion of the sheet between the engaging means into the recess wherein such drawn portion of the sheet will be parted by engagement with the parting means. Herein I employ the term "flow," with reference to the drawing of the sheet metal, to mean change in position of the metal without material change in the thickness and include stretching or shrinking, or both of these effects.

It is an object of the invention to provide a method and apparatus of the above character wherein the sheet metal entering into flange or cup portions of an article is moved under pressure applied through the use of a body of elastic conformable material to a position intermediate its initial position and its final position in engagement with the forming block, is then severed along established lines, and is then further moved toward its final position.

It is a further object of the invention to provide a method of the character set forth in the preceding paragraph wherein portions of a sheet lying in projecting relation to a forming body are in a substantially continuous operation consecutively and/or alternately moved and cut under pressure exerted by a body of elastic conformable material, until such part finally reaches its position of engagement with cooperating areas of the forming member.

This application is a continuation-in-part of my pending application Serial No. 254,657, filed February 4, 1939, for Method and apparatus for drawing, forming, and cutting sheet metal.

Further objects and advantages of the invention will be brought out in the following part of the specification.

Referring to the drawings which are for illustrative purposes only:

Fig. 1 is a perspective view of an article formed from sheet metal by use of the invention.

Fig. 2 is a plan view of a drawing, forming, and cutting die usable in forming the article shown in Fig. 1.

Fig. 3 is a cross-section taken as indicated by the line 3—3 of Fig. 2 and showing above the die a body of yieldable conformable material.

Fig. 4 is an enlarged fragmentary section taken on a plane represented by the line 4—4 of Fig. 2, showing the first operation after placing of the cooperating parts, including the sheet to be formed, in the press.

Fig. 5 is a fragmentary section similar to Fig. 4, showing a subsequent operation, with the sheet in position to be cut after drawing and forming thereof.

Fig. 6 is an enlarged fragmentary section taken on a plane represented by the line 6—6 of Fig. 2.

Fig. 7 is a fragmentary perspective view looking toward a corner of the forming block and the corner cutting member thereat.

Fig. 8 is another perspective view of the corner of the forming block shown in Fig. 7 but taken at a different angle.

Fig. 9 is a plan view of a part produced by an alternative form of my invention.

Fig. 10 is a plan view of the forming block employed in the making of the part shown in Fig. 9.

Fig. 11 is an enlarged fragmentary sectional view taken as indicated by the line 11—11 of Fig. 10, and illustrating the consecutive steps in the formation of the part disclosed in Fig. 9.

The article 10 shown in Fig. 1 may be referred to in accordance with the terminology of the metal working trades as a metal stamping for the reason that it is made from a flat sheet of metal and is drawn, formed, and cut so as to provide a top wall or plate portion 11, having a curved edge 12 with a flange 13 extending downwardly from the edge 12, and essentially straight edges 14 and 15 disposed at right angles to each other and being joined by a rounded corner 16, there being a continuous flange 17 extending down from the edges 14 and 15 and the corner 16.

In the stamping of a part, such as the article 10, from sheet metal, the portions of the sheet which are to form flanges extending downward from contoured edges must be drawn during the flanging operation to prevent wrinkling of the metal. Such drawing of the metal is ordinarily accomplished in standard metal stamping processes by use of companion punch and die parts. In the present invention this same result of forming flanges along contoured edges of an article formed from sheet metal, is accomplished by use of relatively inexpensive forming blocks, avoiding the use of expensive companion punch and die parts, the movement of the sheet metal during the forming operation being accomplished by the application of a body of elastic conformable material, preferably a rubber compound, for the reason that rubber, although it will readily conform itself to the exterior of the forming block, is of such resilient character as to return substantially to its original shape, and for the further reason that rubber compound may be readily obtained in cured state wherein it will not adhere to the surface of the formed article but will readily disengage itself therefrom when pressure is removed.

For the article 10 I provide a forming block 22 having a top face 23, a curved side face 31, and straight side faces 32 and 33 which are disposed in perpendicular planes and are joined by a rounded corner 34. The side face 31 is merged with the top face 23 by a rounded shoulder 35, and the side faces 32 and 33 and the corner 34 are merged with the top face 23 by a rounded shoulder 36. Guide pins 30 are projected from the forming block 22 to provide guides for the sheet which is placed on the forming block prior to the drawing, forming, and cutting of the article 10 from the sheet.

It is a feature of the invention to place adjacent a contoured side face of the forming block 22 a restraining surface against which a projecting portion of the metal sheet may be clamped in a manner to hold or retard the movement of this extended portion toward the contoured side face so that as the metal is shaped down around the contoured side face it will flow and be drawn to the desired shape. In most instances such restraining surface is advantageously provided by use of restraining blocks spaced from the forming block. As shown in Fig. 2, I place a curved restraining block 40 in parallel and spaced relation to the contoured side face 31 and adjacent the corner 34 I place an L-shaped restraining block 41, each of the restraining blocks 40 and 41 having a top face 42 and a side face 43 merging with the top face through a rounded shoulder 44. A space or recess 45 exists between the side face of the restraining member 40 and the side face 31 of the forming block 22, and a space 46 exists between the side face 43 of the restraining member 41 and portions of said faces 32 and 33 adjacent the corner 34. Cutting means are provided adjacent the side faces of the forming block 22 in planes below the top face 23 of the forming block, the positions of these cutting means being determined by the width of the flanges 13 and 17. Such cutting means are shown as cutting edges 48 disposed on upwardly faced knife elements 49 which may be the upwardly turned lips around the edges of a plate 50 which is placed between the forming block 22 and a supporting plate 51 to which the forming block 22, the plate 50, and the restraining members 40 and 41 may be secured. Above the support 51 a movable head 53 is supported, this head having down turned flanges 54 defining a space in which a body of elastic conformable material 55 is held, the inner faces of the walls 54 being spaced so that they will pass down around the peripheral edges of the supporting plate 51 when the head 53 is lowered under pressure.

The drawing, forming, and cutting operation is performed as follows: A sheet of metal, or other sheet material of similar physical characteristics, is placed as shown by dotted lines 60 in Fig. 3, in position resting across the forming block 22, this sheet 60 being provided with openings to receive the guide pins 30 so that the sheet will be positioned with edged portions 61 projecting beyond the limits of the forming block 22 and extending a suitable distance over the restraining members 40 and 41. The head 53 is then lowered under pressure to bring the body 55 into engagement with the sheet 60 to force the same down against the forming block 22, against the restraining members 40 and 41 and likewise toward the surface portions 75 of the supporting plate 51 between the ends of the restraining members 40 and 41, with the result that the article 10 is completely drawn, formed, and cut and remains in completed form, as shown in full lines in Fig. 3, when the head 53 is again raised.

The shaping of the metal from its initial flat form to finished form is believed to take place as follows: As shown in Fig. 4 the elastic conformable body 55 forces the sheet down so that it will be gripped between the body 55 and the forming block 22 and so that the projecting edge portions 61 will be moved downward to engage and be gripped against the upper faces 42 of the restraining members. For the purpose of illustration, Fig. 4 shows only one of the restraining members, namely, member 41, it being understood that the effects illustrated therein are attained also between the restraining member 40 and the cooperating edge of the forming block 22. The upper face 42 of the restraining member 41 is shown in a plane below the upper face 23 of the forming block 22. The difference in height of the faces 23 and 42 may be varied in accordance with the amount of drawing required in shaping the sheet metal around the forming block. Also, the area of engagement of the sheet 60 with the upper face 42 of the forming block 41, and also the preparation of the face 42 for interengagement with the sheet 60, may be varied in accordance with the requirements of each particular article as to whether the edge of the sheet is to be gripped tightly against movement toward the forming block or is to be permitted more or less sliding movement toward the forming block during the forming operation, which conditions in turn depend upon the extent to which the metal is to be drawn, the depth of draw, the flow of the metal to correspond to a desired contour, and the gauge and type of metal to be drawn under conditions such as specified in the foregoing.

As the downward movement of the head 53 continues, the elastic conformable material 55, as shown in Fig. 5, will continue to grip the sheet 60 against the upper face 23 of the member 22 and by pressure of the projecting edge portion 61 against the upper face of the restraining block will restrain this projecting edge portion 61 to the extent desired. For example, the edge portion may be in some instances gripped against any movement whatsoever, but in general practice the edge portion of the sheet is allowed to slide on the upper face of the restraining block to an extent such as indicated in the following description.

The tendency of the material 55 to flow down into the recess 46 between the forming block 22 and the restraining member 41 will force that portion 70 of the sheet 60 which is stretched across the space 46 downward into the space, thereby causing such intervening portion 70 to take the form of a U-shaped channel depending from the rounded shoulders 36 and 44. Inasmuch as the sheet 60 is positively gripped on the member 22 by reason of a large constraining surface and the fact that the pins 30 hold that portion of the sheet from moving, the projecting edge portion 61 will slip relative to the member 41 as the drawing and forming action takes place, until such time as the sheet portion 61 rounds the corner 44 of the member 41 and will be no longer able to slip since the restraint is now in two planes.

The arangement of the restraining members and the cutting edge is such that the sheet 60 will come in contact with the cutting edge almost simultaneously with the gripping of the sheet on the member 41 and therefore the metal will begin stretching in that portion of the sheet between the corner 44 and the cutting edge 48 as the material 55 continues to come down into the recess 46. This stretching will continue until the channel formed by the intervening metal 70 is parted along a line defined by the cutting edge 48, thereby severing the metal portion 70 from the flange portion 17 which is to enter into the flanged product 10, whereupon the pressure and movement of the elastic conformable material 55 will immediately force the flange 17 against the side face 33, and the remainder of the projecting sheet down along the side face 43 of the restraining member 41 as shown in Fig. 3.

In some practices of the invention the surfaces 42 of the restraining members 40 and 41 may be essentially smooth and flat, but where greater restraining effect is required, these surfaces 42 may be prepared by being roughened or contoured so as to produce a complete or partial interengagement between the restraining members 40 and 41 and the sheet metal. As an example of this I have shown a bead 26 on the upper surface of the restraining member 41, such a bead serving to control sliding movement of the edge portion of the sheet 60 relative to the space 42 and also prevent wrinkling of the edge portion 61 of the sheet.

From the foregoing it will be perceived that the flange 17 is nearly completely drawn and formed before it is severed from the peripheral portion of the original sheet 60. The cutting edge 48 may be spaced at such distance from the side face 33 of the forming block 22 that the parting of the sheet will take place after the portion thereof which is to enter into the flange of the finished part is drawn to such an extent that it will not wrinkle during completion of the forming operation. Likewise, the spacing of the cutting edge 48 from the face 33 of the forming block 22 exercises a control over the thickness of the resulting flange 17, since in the carrying out of the process it is not necessary to continue the stretching of the intervening portion 70 of the sheet until the flange portion 17 comes into engagement with the side face 33. Also, a shrinking and consequent thickening of the flange portion 17 may in some instances be accomplished after the parting operation has been performed. Accordingly, the spacing of the parts will not in all instances be exactly as shown in the illustrations, since a number of variable elements are involved, such as width of the finished flange, ductility of the metal, and sharpness of contour of the edge followed by the flange.

Where the flanges are not sharply contoured or curved, and where they are formed along straight edges, raised restraining members, such as the members 40 and 41 need not be employed, but the surface of the supporting plate 51 may serve as a suitable restraining means. As shown in Fig. 6, the projecting edge 61 of the sheet 60 is forced by the material 55 into engagement with the upper face 75 of the supporting plate 51 at a point spaced from the butting blade 48. The intervening portion 76 of the sheet, between the shoulder 36 and the point of engagement with the surface 75, will be caused to flow as it is moved toward the cutting edge 48. Accordingly, if the curvature of the side face 33 of the forming block 22 is not large the metal entering into the flange which is to be formed against the side face 33 may be drawn sufficiently to prevent wrinkling at the gripping of the extreme edge of the sheet 60 against the upper face 75 of the supporting plate 51. So that the restraining effect of the engagement of the projecting edge 61 of the sheet 60 with the surface 75 of the plate 51 may be increased, the surface 75 may be provided with beads or ribs, or several grooves 28 may be cut in the surface 75, as shown in Figs. 2 and 6.

Where selected parts or corners of an article, such as the article 10 of Fig. 1, are to be formed with cutouts 80 between the ends of the flanges 17 and 13, L-shaped trimming knives 81 may be recessed into the corners 82 of the forming block, these corner knives being made as shown in Fig. 7 and having sharp edges 83 to cause the cutting of the excess metal adjacent the corners 82 from the portions of the sheet entering into the flanges 13 and 17. The corner knives 81 each have a pair of wings 85 disposed substantially at right angles and being connected by a curved portion 86. The wings 85 slope downwardly and outwardly so that the side portions 87 of the cutting edge 83 will slope downwardly and outwardly from the upper curved portion 88 of the cutting edge 83, which upper curved portion 88 of the cutting edge 83 is preferably level with the upper face 23 of the forming block 22.

The form of the invention disclosed in the foregoing may be employed for the drawing of reasonably deep flange portions around contoured external portions of a forming block and also within the openings of forming blocks. Where greater depth of draw or flow of the metal is required, beyond the extent obtainable by use of the foregoing form of the invention, a step by step drawing or flowing combined with a step by step cutting of portions of the metal may be employed in the manner taught in Figs. 9, 10, and 11. In Fig. 9 I show a part 90 which has been formed by use of a forming block 91 in a press such as illustrated by the parts 51, 53, and 55 of Fig. 3. In Fig. 11 a characteristic portion of the part 90 is shown to enlarged scale upon that portion of the forming block 91 on which it has been formed. The part 90 comprises a top wall portion 92 having an opening 93 therein defined by a wall or flange 94 which slopes downward and inward and ends in a bead 95. The outer portion of the top wall 90 is joined through a sloping wall portion 96 with an outer wall portion 97 in a plane downwardly offset from the top wall 92. From the edge of the wall portion 97 a flange 98 extends downward. The forming block 91 has a forming body 99 with faces 92a, 94a, 96a, 97a, and 98a corresponding in position and form to the portions 92, 94, 96, 97, and 98 of the formed part 90. This forming body 99 lies in circumscribing relation to an opening or recess 100, lying within and formed in part by the inwardly disposed sloping face 94a. A flow controlling or restraining means 101 is placed in operative relation adjacent the forming member 99, and in particular within the opening or recess 100 of the forming block 91. This restraining means 101 has cooperating means for producing a consecutive step by step movement of the portion of the metal sheet which enters into the formation of the flange 94 and the bead 95, at all times maintaining such restraint and control of this portion of the metal sheet that the relatively deep flange may be drawn in a single substantially continuous operation. The control means 101 comprises a series of separate restraining elements 102, 103, and 104, each having a parting means 102a, 103a, and 104a associated therewith. The restraining means 102, 103, and 104 comprise consecutive steps progressing upwardly and away from the inner edge of the channel shaped face 95a, the number of these steps employed being determined by a number of different factors including the depth of draw of the flange 94. The steps 102, 103, and 104 may be formed by mounting steel plates 106, 107, and 108, of similar peripheral form but of gradually decreased area, in spaced relation, so that the upper plate 108 will lie in or near the plane of the upper face 92a and the lower plate 106 will lie in a plane at or slightly above the inner edge of the channel shaped face 95a. The plate 106 may be supported upon a portion 109 of the forming block 91 and the plates 107 and 108 may be respectively carried on suitable filler pieces 110 and 111 formed from any suitably strong or hard material, such as Masonite. In the form of the invention shown the upper step 104 comprises the upper face of the plate 108, but the steps 103 and 102 consist only of the projecting peripheral portions of the plates 107 and 106. The parting means 102a, 103a, and 104a consist of sharp edges formed around the peripheries of the plates 106, 107, and 108.

A knife edge 112 is provided adjacent and below the outer face 98a by use of a steel plate 113 which lies in part under the forming body 99 and has a diagonally upwardly projecting lip 114 on which the severing or parting edge 112 is formed. The plate 113 need not extend entirely across the under face of the forming block 91 and a filler plate 115 of a cheap but suitably strong material may be placed adjacent that portion of the lower face of the forming block 91 not covered by the plate 113.

Forming of the part 90 by use of the forming block 91 is conducted in the following manner. A sheet 120 of suitable material, such as duralumin, for example, is placed across the top face of the forming block 91, and a body of yieldable material, such as the body 55 of Fig. 3, is brought downward under pressure against the upper face of the sheet 120. The first action of this body of yieldable material is to force the sheet into tight engagement with the face 92a of the forming member 99 and with the step 104. As pressure is increased in the yieldable material the peripheral portion 121 of the sheet 120 will be forced down toward or into a position such as indicated by dotted lines 121a. The portion 122 of the sheet 120 which projects from the face 92a to the step 104 will be forced downward in the channel or space between the shoulder 123 and the cutting edge 104a of the step 104, this, as indicated by dotted lines 122a. This will result in a drawing and flowing of the sheet portion 122 so that it will be carried partly around the shoulder 123, and at or about the time the portion 122 reaches the position indicated by dotted lines 122a, the sheet 120 will part along the cutting edge 104a and the portion of the sheet which may be referred to by the numeral 122a will then drop down so that the edge portion 124 thereof engages the step 103, leaving a plate 125 of scrap or salvage resting on the step 104. The release of the inner edge of the sheet portion 122b when it is severed from the edge 126 of the plate 125, permits the sheet portion 122b to move downward and also toward the face 94a, with the result that there is a definite flowing of metal in the sheet portion 122b, accompanied by an expansion of the edge portion 124 thereof which makes engagement with the step 103. There may or may not be some movement of the edge of the sheet portion 122b after it is forced into engagement with the step 103.

As the pressure is increased in the body of elastic or yieldable and conformable material, tension exerted in the sheet portion 122b causes a parting of the same along the cutting edge 103a leaving the edge portion 124 thereof resting upon the step 103 while the remainder 122c of the sheet portion 122b is moved downward and further toward the face 94a, the edge portion 128 of this remaining sheet portion 122c being forced into engagement with the step 102, to restrain such edge portion 128 as the sheet is drawn and worked downward toward the face 95a, this being followed by a parting of the sheet portion 122c at the cutting edge 102a, leaving the edge portion 128 thereof lying upon the step 102 and permitting the flange and the bead portions of the sheet, respectively 94 and 95, to be forced under heavy pressure against the faces 94a and 95a, as shown in full lines.

At some time during the above described consecutive steps of drawing and cutting the sheet portion 122, the projecting sheet portion 121 will be brought into a position such as indicated at 121b, wherein the cutting edge 112 will be engaged and the flange 98 will be severed from the extending part 130 of the projecting sheet portion 121, after which pressure applied through the yieldable or elastic material will force the flange 98 into tight engagement with the face 98a.

The form of the invention disclosed in Figs. 9 to 11 embraces the characteristics described relative to Figs. 1 to 6 inclusive, but enlarges upon the same. For example, each step 102, 103, and 104 has a cutting edge associated therewith, which cutting edge is disposed between the restraining means formed by each step and the shoulder 123 and/or the face 94a. Although the cutting edges 102a, 103a, and 104a are formed by the plates 106, 107, and 108 which likewise form the steps 102, 103, and 104, it is the upwardly presented faces of these steps that comprise the respective restraining means, and, accordingly, it may be properly said that the parting means formed by the cutting edges are disposed between the restraining means and the shoulder 123 or side face 94a of the forming body. In each form of the invention the edge portion of the projecting sheet is restrained so that there will be a flowing of the metal as the projecting portion moves toward the side face of the forming block, and then a part of the projecting sheet portion in which working and crystallization of the metal has occurred, is severed from that part of the projecting sheet portion which contains the metal which is to enter into the formation of a contoured flange.

I claim as my invention:

1. In a device to draw, form, and cut an article from sheet metal for use between a support and a body of yieldable material which is moved toward said support under such pressure as to be caused to conform to the exterior of an object on said support, the combination of: a forming block on said support, said forming block having a top face and a side face joined to said top face by a shoulder; a restraining block spaced from said forming block, said restraining block having a top face and a side face, said side face of said restraining block being spaced from said side face of said forming block so that a recess is formed between said faces into which a portion of the sheet may be forced by said material; and parting means positioned in said recess between and in spaced relation to said forming block and said restraining block and located below a line connecting the shoulders of said blocks, and at a place to engage a portion of the sheet metal which has been forced into said recess, before the forming operation of said portion of said sheet metal has been completed, whereby said parting means serves to remove the severely worked portion of the metal lying between said parting means and said restraining block.

2. In a device to draw, form, and cut an article from sheet metal, for use between a support and a body of yieldable material which is moved toward said support under such pressure as to be caused to conform to the exterior of an object on said support, the combination of: a forming block having a top face and a side face; and a stepped restraining means lying to the side of said block, said restraining means having a plurality of steps consecutively downwardly and toward said block, each of said steps having an upper face to receive portions of the sheet during the forming operation and having parting means associated therewith so that portions will be cut from said sheet as the drawing and forming operation progresses.

3. In a device to draw, form, and cut an article from sheet metal, for use between a support and a body of yieldable material which is movable toward said support under such pressure as to be caused to conform to the exterior of an object on said support, the combination of: a forming block having a top face and a side face; and a stepped restraining means lying to the side of said block, said restraining means having a plurality of steps consecutively downwardly and toward said block, each of said steps having an upper face to receive portions of the sheet during the forming operation and having a relatively sharp parting shoulder at the edge thereof so that portions will be cut from said sheet as the drawing and forming operation progresses.

4. In a device to draw, form, and cut an article from sheet metal, for use between a support and a body of yieldable material which is movable toward said support under such pressure as to be caused to conform to the exterior of an object on said support, the combination of: a forming block having a top face and a side face; a stepped restraining means lying to the side of said block, said restraining means having a plurality of steps offset consecutively downwardly and toward said block, each of said steps having an upper face to receive portions of the sheet during the forming operation and having parting means associated therewith so that portions will be cut from said sheet as the drawing and forming operation progresses; and means forming a channel between said side face of said forming block and the lowest of said parting means.

5. In a method of forming a flanged article from sheet material by drawing, cutting and shaping the sheet, the steps of: applying a yieldable material to said sheet, to hold same against a forming block and a restraining surface spaced from said forming block to provide a space into which a portion of said sheet may be forced; applying additional pressure to said yieldable material so as to force a portion of said sheet into said space to form this part of said sheet into a U-shape; cutting said sheet along a line within said space and separated from said forming block and restraining surface but closer to said forming block to remove a greater portion of the U-shaped part of said sheet in said space; and continuing the application of pressure by said yieldable material to move the remaining portion of said sheet in said space toward said forming block to complete the forming operation.

6. In a method of forming a flanged article from a sheet by drawing, cutting, and shaping the same in a substantially continuous operation over a forming block having a top face and a side face, the steps of: applying a body of yieldable material to the sheet to force it against the forming block; increasing the pressure in said material so that a portion of said sheet projecting from the top face of said forming block will be deflected downward; restraining said projecting portion of said sheet at a restraining surface spaced from said forming block so that it will flow as it is forced downward into said space toward said side face of said block; severing a portion of said projecting portion of said sheet from the remainder of said projecting portion of said sheet at a location within said space between said forming block and said restraining block and separated from said forming block and said restraining surface in such a manner to remove from said projecting portion of said sheet the most severely worked part thereof; and continuing the application of pressure in said material to move said remainder of said projecting portion of said sheet into fully formed position.

7. In a method of forming a flanged article from a sheet by drawing, cutting, and shaping the same in a substantially continuous operation over a forming block having a top face and a side face, the steps of: applying a body of yieldable material to the sheet to force it against the forming block while restraining said projecting portion of said sheet at a place spaced from said forming block so that it will flow as it is forced downward into said space toward said side face of said block; severing a portion of said projecting portion of said sheet from the remainder of said projecting portion of said sheet; continuing the application of pressure in said material to move further toward said side face of said block said remainder of said projecting portion of said sheet; restraining and severing in said space an additional part of said projecting portion of said sheet from said remainder; and by pressure applied through said material moving the residual part of said remainder toward said forming block.

8. In a device to draw, form, and cut an article from sheet metal for use between a support and a body of yieldable material which is moved toward said support under such pressure as to be caused to conform to the exterior of an object on said support, the combination of: a forming block on said support, said forming block having a top face and a side face; a restraining surface spaced from said forming block in such a manner that a recess is formed between said forming block and said restraining surface into which a portion of the sheet metal may be forced by said material; and parting means positioned in said recess between and in spaced relation to said forming block and said restraining surface and located below a line connecting said restraining surface and the top face of said forming block, and at a place to engage a portion of the sheet metal which has been forced into said recess, after said portion has been partly formed and before the forming operation on said portion of said sheet metal has been completed, whereby said parting means serves to remove the severely worked portion of the metal lying adjacent said restraining surface.

CHARLES C. MISFELDT.